March 9, 1965    G. S. COLE    3,172,426
PROPORTIONING VALVE
Filed Aug. 1, 1961    4 Sheets-Sheet 1
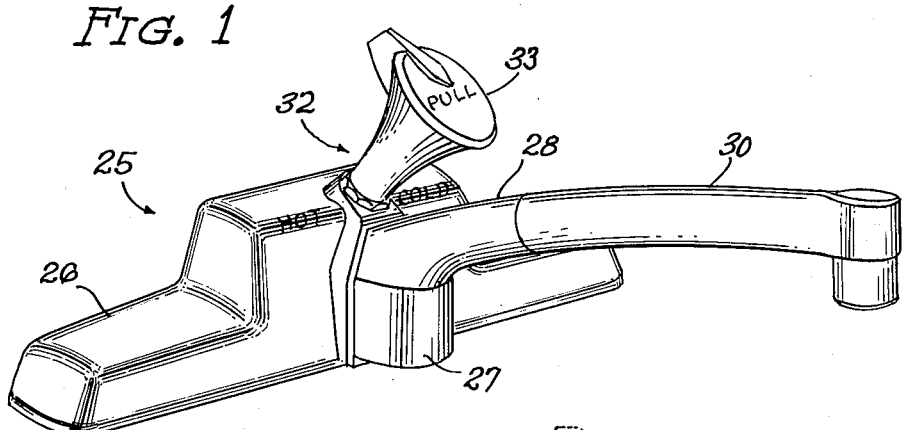
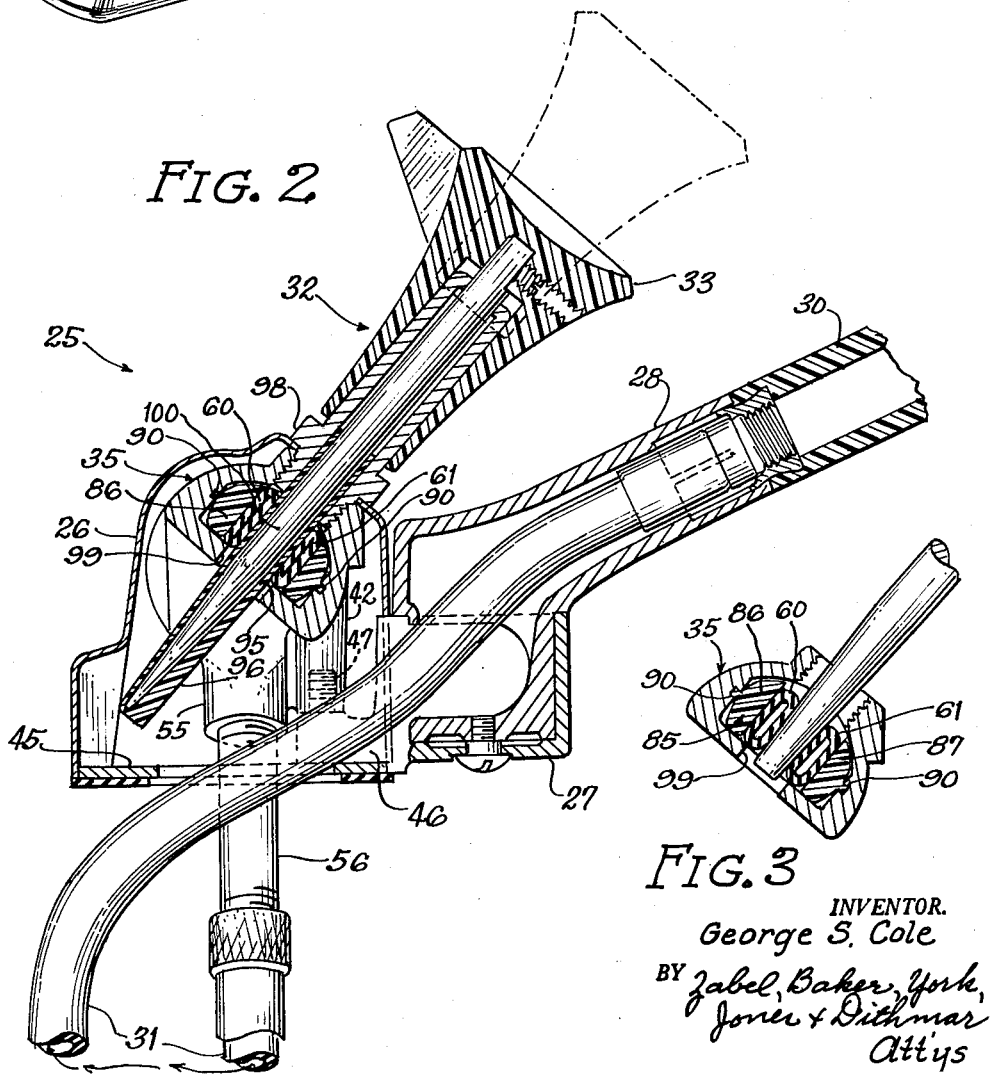
INVENTOR.
George S. Cole
BY Zabel, Baker, York,
Jones & Dithmar
Att'ys March 9, 1965  G. S. COLE  3,172,426
PROPORTIONING VALVE
Filed Aug. 1, 1961  4 Sheets-Sheet 2

INVENTOR.
George S. Cole
BY Zabel, Baker, York,
Jones & Dithmar
Att'ys

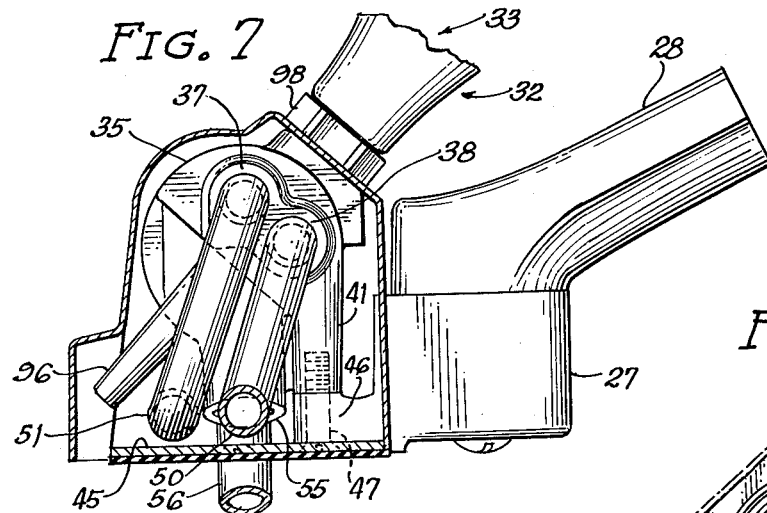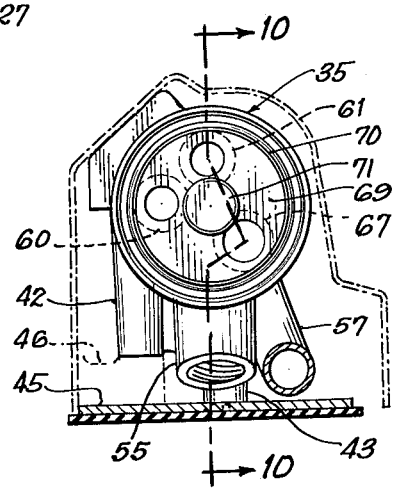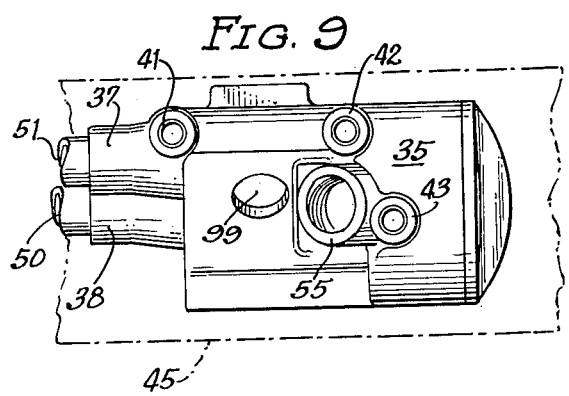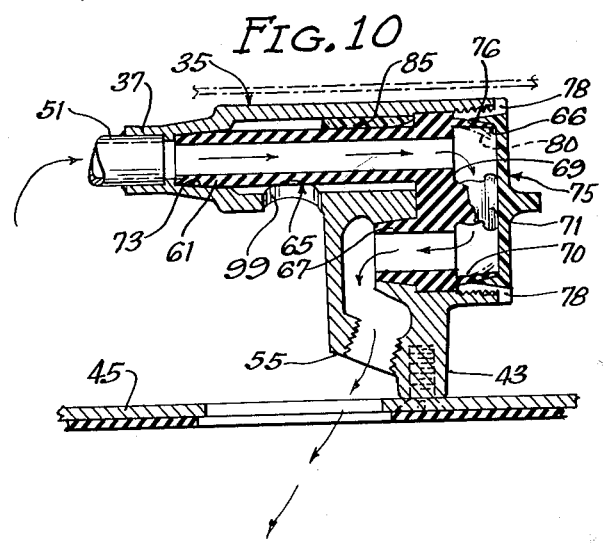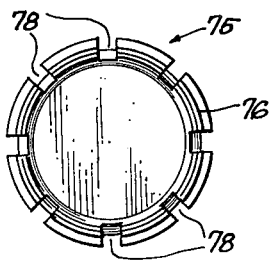

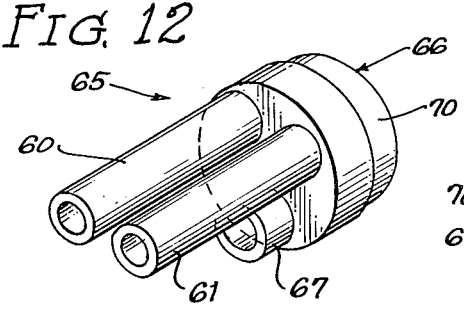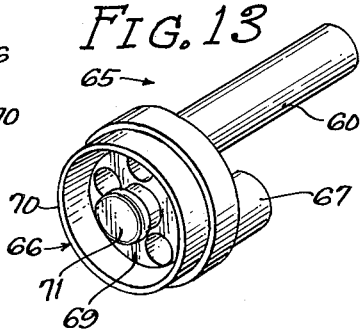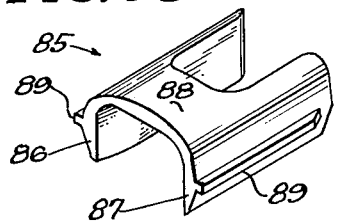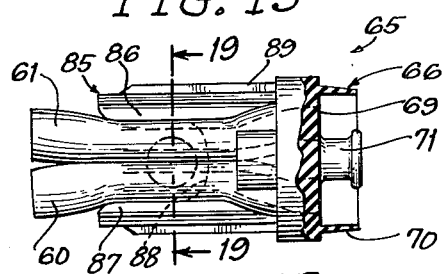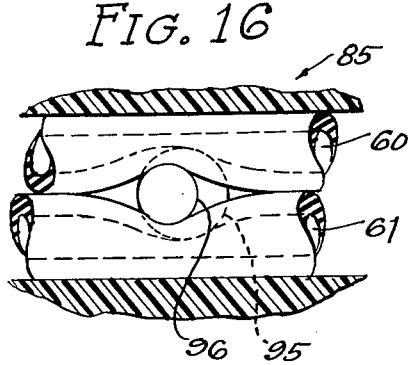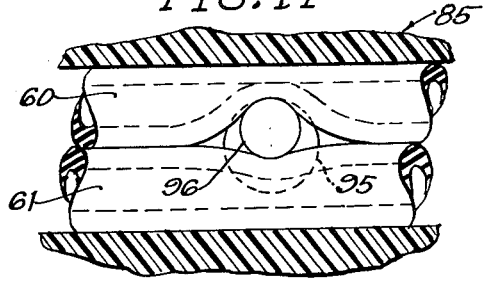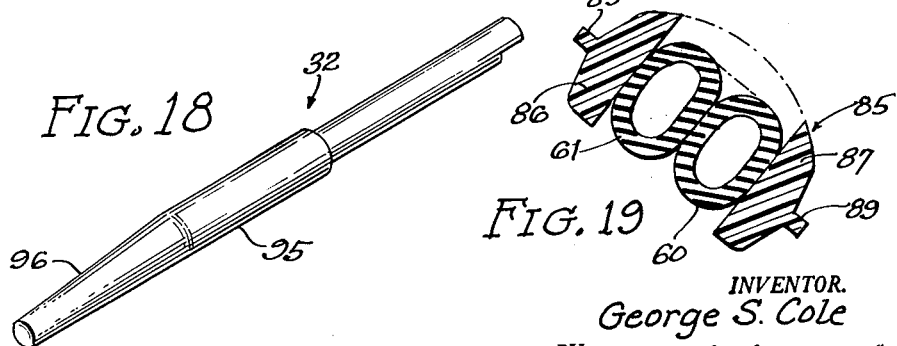

United States Patent Office 3,172,426
Patented Mar. 9, 1965

1

3,172,426
PROPORTIONING VALVE
George S. Cole, 900 Lake Shore Drive, Chicago, Ill.
Filed Aug. 1, 1961, Ser. No. 128,564
14 Claims. (Cl. 137—636.4)

This invention relates to a proportioning valve for two streams of fluid.

The present application is a continuation-in-part application of my prior, copending application for Proportioning Valve, Serial No. 549,350, filed November 28, 1955, now abandoned.

One object of the invention is to provide a proportioning valve which is characterized by extreme simplicity and economy of manufacture.

Another object is to provide a proportioning valve wherein there essentially is only one moving part. This part functions (1) to proportion the flow of the two streams of fluid, (2) to control the quantity of flow and (3) to open and close the valve elements through which the two streams flow.

Another object is to provide a valve of this type which will have a long life and wherein the elements subject to possible wear easily may be withdrawn and replaced. No special tools are necessary in servicing the valve, should servicing be necessary. Indications are, however, that a valve constructed in accordance with the invention will have a trouble-free life in excess of twenty-five years. Another object is to provide a proportioning valve which wholly eliminates the use of conventional valve seats, valve disks, gaskets, packing, washers, strainers, springs and linkages.

The present valve is substantially corrosion-proof and abrasion-proof inasmuch as the fluid with which the valve is used does not come into contact with the moving part of the valve. For this reason the moving part may have permanent lubrication, and no other lubrication is necessary. Also, inexpensive materials may be used in the valve. There are no relatively movable metal parts which are contacted by the fluid passing through the valve.

Another object is to provide a proportioning valve which is not subject to electrolysis, pressure hammer and cross flow.

The valve of the invention does not trap sediment which may be present in the fluid used with the valve or in the pipes leading to the valve. Sediment in the pipes is common in new installations, and often causes serious problems with proportioning valves of other designs. The control element of the present valve readily can be removed to permit complete flushing of the valve and the passage of all such sediment.

Briefly described, the present valve comprises a pair of spaced resilient tubes each of which is connected to pass a stream of fluid. The two streams may be hot and cold water, for example, but the valve is useful for other fluids having other different characteristics.

Fluid flow through the two tubes is adjusted by a control element which extends between and in effective relation with the two tubes. The control element includes a cylindrical portion and a cam portion of tapering shape which in operation are effective to vary relatively the cross sections of the tubes, thus to control and proportion the fluid flow through the tubes.

In the form of the invention shown, the cam portion has the shape of an eccentric cone, and the control element is mounted both for back and forth axial movement and for axial rotation. The axial movement, generally speaking, is effective to open and close the tubes and control the quantity of fluid flow, while axial rotation of the control element is effective to proportion the flow relatively between the two tubes, as will be seen.

2

Another and more detailed object of the invention is to provide a unitary cartridge member which includes the resilient tubes mentioned above. This cartridge member also cooperates to provide a mixing chamber for the two streams of fluid.

Another object is to provide a saddle member which functions to support and distort the resilient tubes and position them for proper relation with the control element of the valve. In addition, the saddle member serves a back-up function for the tubes during distortion of the tubes by the control element.

Another object is to provide in the valve a vacuum breaker mechanism which prevents a back-siphon condition. The aforesaid cartridge member constitutes one element of this vacuum breaker mechanism.

Other objects, advantages and details of the invention will be apparent as the description proceeds, reference being had to the accompanying drawings wherein a valve embodying the invention is shown as part of a faucet. It is to be understood that the description and drawings are illustrative only and the scope of the invention is to be measured by the appended claims.

In the drawings:

FIG. 1 is a perspective view of a hot and cold water faucet embodying the proportioning valve of the invention.

FIG. 2 is an enlarged fragmentary sectional view of the faucet shown in FIG. 1, the valve being shown in fully closed condition.

FIG. 3 is a fragmentary sectional view showing the valve in more or less fully opened condition with roughly fifty-fifty proportioning between the two fluid streams.

FIG. 7 is an enlarged fragmentary sectional view on line 7—7 of FIG. 4.

FIG. 8 is a sectional view on line 8—8 of FIG. 6.

FIG. 9 is a bottom view of the proportioning valve with the control element omitted.

FIG. 10 is a sectional view on irregular line 10—10 of FIG. 8.

FIG. 11 is an inside view of a cap used in the valve, the cap having vents which cooperate to provide a vacuum breaker mechanism.

FIG. 12 is a perspective view of the cartridge member used in the illustrated form of the invention.

FIG. 13 is another perspective view of the cartridge member shown in FIG. 12.

FIG. 14 is a perspective view of the saddle member used in the illustrated form of the invention.

FIG. 15 is a plan view, partly in section, showing the sub-assembly of the cartridge and saddle members.

FIG. 16 is a fragmentary elevational view, partly in section, showing the valve parts in a proportioning position.

FIG. 17 is an elevational view, partly in section, showing the valve parts in position wherein one tube is closed and the other is opened to the maximum extent permitted by the illustrated longitudinal position of the control element.

FIG. 18 is a perspective view of the control element used in the illustrated form of the invention, the handle portion thereof being omitted.

FIG. 19 is a sectional view on line 19—19 of FIG. 15.

Figure 4:
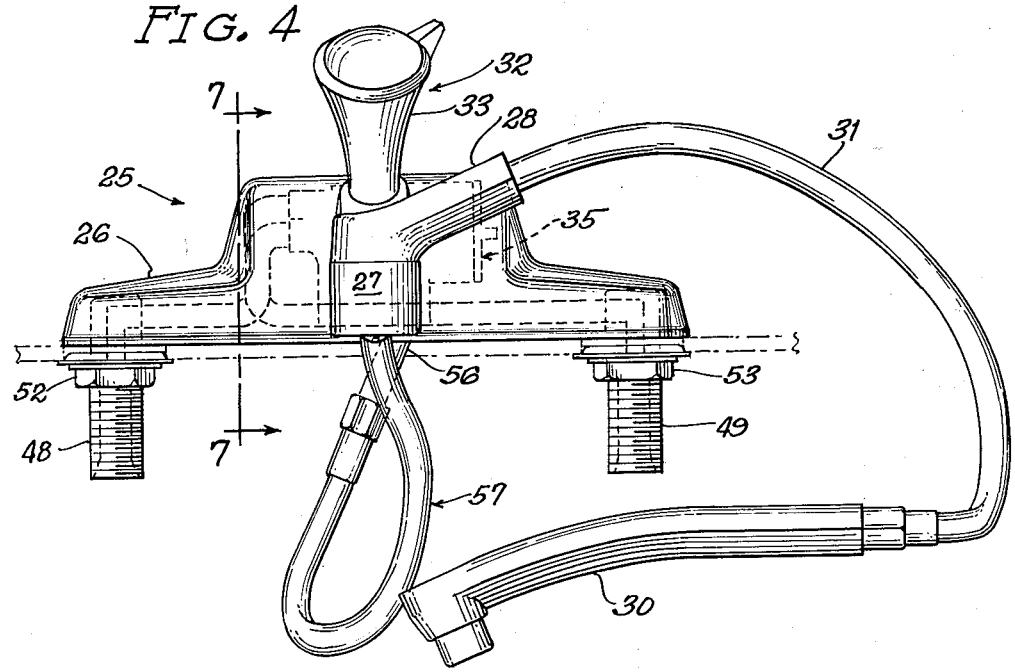
FIG. 4 is a front elevational view of the faucet showing the spout member detached for use as a portable spray element.
Figure 5:
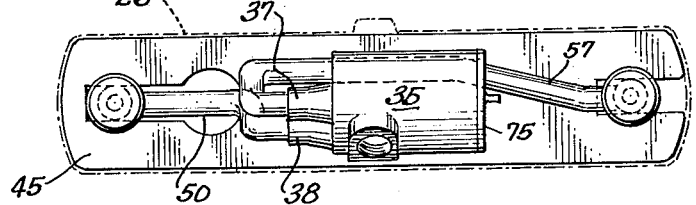
FIG. 5 is a top view of the proportioning valve part of the faucet with the control element omitted.

Referring now to the drawings, a faucet embodying the proportioning valve of the invention is designated 25 in FIGS. 1, 2 and 4. Faucet 25 includes an external housing 26 of suitable design and stationary part 27 of a swivel spout. A swivel part 28 of the spout is rotatably mounted on stationary part 27, as shown in greater detail in FIG. 2.

A spout member 30 is detachably associated with swivel part 28. As will be seen, spout member 30 is connected to the valve by an elongated flexible hose 31 (FIGS. 2 and 4) whereby the spout member may function as a portable spray element. Spout member 30 is shown detached from swivel part 28 in FIG. 4.

The present proportioning valve is actuated by a single control element 32 of which only handle portion 33 is shown in FIGS. 1 and 4. As will be seen, control element 32 is rotatable on and movable along its axis. Generally speaking, axial movement of control element 32 regulates the quantity of fluid flow in one or both of the streams, while rotation of the control element proportions the flow as between the two streams. For practical purposes a proportioning adjustment of the control element is not altered by moving the element axially to vary the flow quantity from zero to maximum.

The proportioning valve of the invention also includes a valve body 35 (FIGS. 2, 3 and 5–10), sometimes hereinafter called a support means. It will be seen that valve body 35 performs mainly support and stream-directing functions, and that therefore the body may consist of individual supporting and stream-directing elements. As illustrated, valve body 35 is of irregular shape. It has a generally hollow interior and an inlet for each fluid stream. The valve inlets are designated 37 and 38 in FIGS. 5–7 and 9.

In the form of the invention shown, the illustrated valve body 35 is mounted horizontally by means of legs 41, 42 and 43 (FIG. 9) which are suitably secured to a mounting plate 45. As best shown in FIGS. 2 and 7, portion 46 of swivel spout stationary part 27 is positioned between the ends of legs 41 and 42 and mounting plate 45. Thus, screws 47 (FIGS. 2 and 7) which extend through mounting plate 45 to anchor legs 41 and 42 likewise cooperate to secure stationary part 27.

Figure 6:
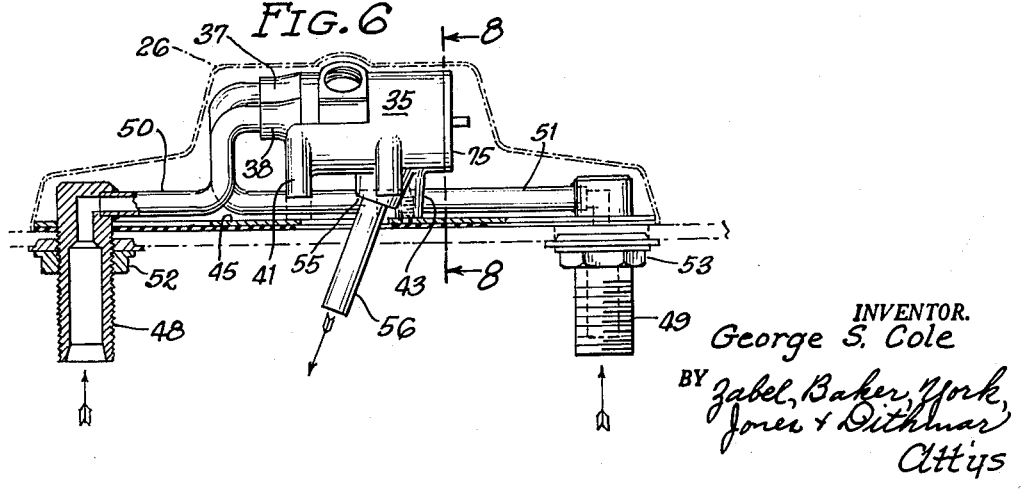
FIG. 6 is a front elevational view of the structure shown in FIG. 5.

Referring to FIG. 6, the illustrated faucet has conventional fittings 48 and 49 for connection with the pipes or lines of two streams of fluid, for example, lines of hot and cold water. Fitting 48 is connected to valve inlet 38 by pipe 50, and fitting 49 is connected to valve inlet 37 by pipe 51. Pipes 50 and 51 are sealingly secured at their ends in any suitable manner as by solder. Fittings 48 and 49 are externally threaded and provided with nuts 52 and 53 to attach the faucet to a sink top or the like.

Valve body 35 has an outlet 55 (FIGS. 2, 6 and 7–10) suitably coupled as by pipe 56 (FIGS. 2, 4, 6 and 7) to flexible hose 31 which extends to spout member 30. As best shown in FIG. 2, flexible hose 31 extends through a portion of housing 26, stationary part 27 and swivel part 28. Suitable clearance must be provided below the faucet to accommodate the loop 57 (FIG. 4) in flexible hose 31 which is provided to permit the spout member to serve as a portable spray element.

A pair of resilient tubes 60 and 61 are positioned within valve body 35. These tubes are formed from neoprene or other durable resilient material which is chemically inert to the fluids used in the valve and is unaffected by temperatures in the range encountered. As will be seen, the manner in which flow is shut off in the tubes and the resilience of the tubes themselves cooperate to prevent the occurrence of water hammer in the system with which the valve is used.

Tubes 60 and 61 used in the illustrated form of the invention are parts of a unitary cartridge member 65, best shown in FIGS. 10, 12, 13 and 15. In addition to tubes 60 and 61, cartridge member 65 includes a hollow head portion 66 and an outlet means 67 communicating with the head portion. Tubes 60 and 61 likewise communicate with head portion 66, as shown in FIGS. 10 and 13.

Head portion 66 of the illustrated cartridge member 65 is generally cup-shaped (FIGS. 10, 13 and 15). The cup-shaped head portion 66 includes a bottom 69 and a comparatively thin resilient annular wall 70. A central boss 71 extends upwardly from bottom 69 and serves both as a gauge for positioning cartridge member 65 in the valve body and as a handle for manipulation.

Referring to FIG. 10, cartridge member 65 is shown mounted in valve body 35. The inlet or free ends of tubes 60 and 61 are received in tapering bores 73 provided in the valve body interior, these bores communicating respectively with valve inlets 37 and 38. The slight taper in the bores 73 insures a fluid tight connection between the tubes 60 and 61 and the valve body. This connection is self-sealing and requires no packing or other seal, and the tightness of the seal increases with an increase in fluid pressure within the tubes.

Referring further to FIG. 10, the open end of valve body 35 through which cartridge member 65 is inserted and removed is closed by a detachable cap 75 which has an annular flange 76 threaded to or otherwise secured at the open end of valve body 35. The inner surface of flange 76 is tapered, as shown in FIG. 10, and annular wall 70 of cartridge head portion 66 interiorly telescopes the tapered flange.

The relationship between resilient annular wall 70 of head portion 66 and annular wall 76 of cap 75 provides a sealed connection which increases in tightness with an increase of fluid pressure within the head portion. The space defined by bottom 69, annular wall 70 and cap 75 constitutes a mixing chamber wherein fluid from tubes 60 and 61 is mixed before it is discharged through cartridge outlet means 67 and outlet 55 of the valve body.

It will be noted that cap 75 engages cartridge boss 71, thus functioning in cooperation with the boss to urge cartridge member 65 to proper position within valve body 35. When so positioned, the free ends of tubes 60 and 61 have proper sealed relation with tapered bores 73 of the valve body. Further, the engagement of cap 75 with boss 71 prevents cartridge member 65 from shifting out of proper position during use of the valve. Boss 71, of course, is grasped in withdrawing cartridge member 65 from valve body 35.

Head portion 66 of cartridge member 65 may function, if desired, as an element in a vacuum breaker mechanism. Such mechanism should be used in a faucet wherein the spout member also serves as a portable spray element. A vacuum breaker serves the well known purpose of preventing back-siphon action in the event of a pressure reversal within the valve or in the fluid lines leading to the valve.

In the illustrated form of the invention the other element of the vacuum breaker mechanism is annular flange 76 on cap 75 which is provided with a plurality of vents 78 (FIGS. 10 and 11). If a pressure reversal occurs in the mixing chamber, resilient annular wall 70 simply bends inwardly as shown in dotted line at 80 in order to break the seal between wall 70 and annular flange 76 of the cap. Thus, no fluid can be drawn into the valve through spout member 30.

In the form of the invention shown, tubes 60 and 61 are positioned with precision in valve body 35 by means of a saddle member 85, best shown in FIG. 14. Saddle member 85, which may be formed from molded plastic or the like, includes a pair of spaced walls 86 and 87 adapted to engage and position the outer walls of the tubes 60 and 61. In preferred form, the inner surfaces of the walls 86 and 87 are flat, except at the ends, and parallel to each other. Walls 86 and 87 are held in spaced parallel relation by means of a reduced web portion 88. The shortened length of web portion 88 provides clearance for control element 32, as will be seen, and for tubes 60 and 61 when distorted.

As illustrated, walls 86 and 87 of saddle member 85 each have a longitudinal positioning key or rib 89 on the exterior surface. As best shown in FIGS. 2 and 3, ribs 89 are received in, and seat on the bottoms of, grooves 90 formed in the valve body interior. Saddle member 85 is so designed that it occupies proper position within valve body 35 when ribs 89 are seated on the bottoms of grooves 90. In other words, the size and shape of saddle member 85 and the location and size of grooves 90 are held to rather close tolerances during manufacture.

Saddle member 85 has plural functions. Firstly, walls 86 and 87 thereof provide back-up surfaces against which tubes 60 and 61 are squeezed by control element 32 in varying the tube cross sections. Secondly, it provides back-up surfaces which have true parallel relation with the axis of control element 32, thus insuring complete closure of the tubes when the latter are engaged by a cylindrical portion of the control element. Thirdly, saddle member 85 embraces tubes 60 and 61 in a tube-deforming manner, as best shown in FIGS. 15 and 19. With a control element of the shape illustrated, an initial deformation of tubes 60 and 61 is desirable so that significant size changes in the tube cross sections will occur in response to relatively small actuation of the control element.

Control element 32 includes, in addition to handle portion 33, a cylindrical portion 95, best shown in FIG. 18, and an eccentric cone or generally conical portion 96. Control element 32 is journalled with respect to valve body 35 and, as shown in FIG. 2, engages a bearing 98 which is threaded into the valve body. An aperture 99 is provided on the bottom side of the valve body in general alignment with bearing 98 so control element 32 may extend therethrough (FIG. 2).

As best shown in FIGS. 16, 17 and 18, cylindrical portion 95 of control element 32 is coaxial with the axis of the control element. The larger end of conical portion 96 is adjacent to, concentric with and the same diameter as cylindrical portion 95. The smaller end of conical portion 96 is eccentric with cylindrical portion 95. As will be seen, some part of control element 32 at all times engages both tubes 60 and 61, and in so doing establishes the effective cross-sectional shape and area of the tubes. Cylindrical portion 95 when engaging the tubes is effective in any angular position to close fluid flow through both of the tubes in a positive manner. Conical portion 96 when engaging the tubes is effective on rotation to proportion the fluid flow through the tubes and on axial movement to control the quantity or volume of fluid flow.

In preferred form, a longitudinal surface line on eccentric cone portion 96 is colinear with a line on the surface of cylindrical portion 95. This surface line on eccentric cone portion 96 lies on the region of cone portion 96 which is effective to distort one of the tubes 60, 61 to fully closed position in the proportioning adjustment of the valve.

As will be understood, when control element 32 is moved axially so that cylindrical portion 95 engages the tubes 60 and 61, both tubes are fully closed. As previously mentioned, the tube engaging surfaces of walls 86 and 87 of saddle member 85 are parallel to each other and to the axis of control element 32. This relationship insures that cylindrical portion 95 of control element 32 is effective to close the tubes even under extreme pressure conditions. As seen in FIG. 2, the distorted walls of closed tubes 60 and 61 extend into the space which is in alignment with reduced web portion 88 of saddle member 85.

For the proportioning function, control element 32 first is moved axially until eccentric cone portion 96 is in engagement with tubes 60 and 61. Rotation of control element 32 and eccentric cone portion 96 varies the tube cross sections relatively to provide all possible proportioning ratios. When a desired ratio has been established, the flow quantity may be varied simply by moving the control element axially, in which case the proportioning ratio remains generally the same. As previously mentioned, because a line on eccentric cone portion 96 is colinear with a line on cylindrical portion 95, it is possible to block the flow completely in one tube and at the same time have flow in any desired quantity through the other tube.

It should be mentioned that the structure and geometry of this proportioning valve are such that the total flow through both tubes at any proportional setting never can exceed the maximum flow through either one of the tubes. Flexible tube 31 and spout member 30 are designed to pass the maximum flow permitted by either tube. In view of the fact that the combined flow through both tubes never exceeds the maximum flow through either tube, the development of a back-pressure condition is avoided. Thus, it is impossible in this valve for a predominant flow in one tube to affect and alter the subordinate flow in the other tube, as is often the case with proportioning valves of other designs.

Referring to FIG. 2, the illustrated control element 32 has cylindrical portion 95 and eccentric cone portion 96 formed of plastic material such as nylon overlying an inner core 100. While inner core 100 has one portion in the shape of a cylinder and another portion in the shape of a true cone, it is apparent that the core may be of uniform cross section throughout the region covered by plastic. In fact, in some instances a core may be eliminated entirely, and both effective portions of control element 32 may be made entirely of molded plastic.

Nylon is particularly effective for use in control element 32 because of its toughness, rigidity and self-lubricating characteristic. In extended tests a nylon control element has been operated the equivalent of over twenty-five years normal use without showing any wear and without damage of any kind to resilient tubes 60 and 61 formed of neoprene.

From the above description, it is thought that the construction and advantages of the invention will be readily apparent to those skilled in the art. Various changes in detail may be made without departing from the spirit or losing the advantages of the invention.

Having thus described the invention, what I claim as new and desire to secure by Letters Patent is:

1. A proportioning valve for two streams of fluid comprising:
   a valve body having a hollow interior and an inlet for each fluid stream;
   a cartridge member within said valve body, said cartridge member including a pair of resilient tubes communicating with said inlets, a cup-shaped head portion communicating with said tubes and outlet means communicating with said head portion;
   a detachable cap secured to said body in sealing engagement with the open end of said cup-shaped head portion and cooperating with said head portion to form a mixing chamber;
   and a control element journalled in said valve body and extending transversely between said tubes, said control element having a generally cylindrical portion and an eccentric cone portion each engageable with said tubes, said control element rotatable on and movable along its axis to vary relatively the cross sections of said tubes and thereby proportion and open and close the fluid flow through said tubes;
   said valve body having an outlet communicating with the outlet means of said cartridge member.

2. The combination of claim 1 wherein said cap has an annular flange and wherein said cup-shaped head portion has a resilient annular wall, said annular wall telescoping within said annular flange and providing self-sealing engagement between said cap and said head portion, the tightness of the seal increasing with fluid pressure within the mixing chamber.

3. The combination of claim 2 wherein the annular flange on said cap is vented to the exterior of said valve body to provide a vacuum breaker effective in the event of a pressure reversal within the mixing chamber.

4. A proportioning valve for two streams of fluid comprising:
   a valve body having a hollow interior and an inlet for each fluid stream;
   a cartridge member within said valve body, said cartridge member including a pair of resilient tubes communicating with said inlets, a hollow head portion communicating with said tubes and outlet means communicating with said head portion;
   and a control element extending transversely between said tubes and engaging and establishing the cross sectional shape of said tubes, said control element rotatable on and movable along its axis and having a generally cylindrical portion coaxial with said axis and a generally conical portion, the larger end of said conical portion adjacent to, concentric with, and the same diameter as said cylindrical portion, the smaller end of said conical portion eccentric with said cylindrical portion, said cylindrical portion when engaging said tubes effective in any angular position to close fluid flow through both said tubes in a positive manner, said conical portion when engaging said tubes effective on rotation to proportion the fluid flow through said tubes and on axial movement to control the quantity of fluid flow;
   said valve body having an outlet communicating with the outlet means of said cartridge member.

5. A proportioning valve for two streams of fluid comprising:
   a valve body having a hollow interior and an inlet for each fluid stream;
   a pair of resilient tubes within said valve body and communicating with said inlets;
   and a control element extending transversely between said tubes and engaging and establishing the cross sectional shape of said tubes, said control element rotatable on and movable along its axis and having a generally cylindrical portion coaxial with said axis and a generally conical portion, the larger end of said conical portion adjacent to, concentric with, and the same diameter as said cylindrical portion, the smaller end of said conical portion eccentric with said cylindrical portion, said cylindrical portion when engaging said tubes effective in any angular position to close fluid flow through both said tubes in a positive manner, said conical portion when engaging said tubes effective on rotation to proportion the fluid flow through said tubes and on axial movement to control the quantity of fluid flow;
   said valve body having an outlet communicating with said tubes.

6. A proportioning valve for two streams of fluid comprising:
   a support means;
   a pair of resilient tubes mounted in said support means;
   and a control element extending transversely between said tubes and engaging and establishing the cross sectional shape of said tubes, said control element rotatable on and movable along its axis and having a generally cylindrical portion coaxial with said axis and a generally conical portion, the larger end of said conical portion adjacent to, concentric with, and the same diameter as said cylindrical portion, the smaller end of said conical portion eccentric with said cylindrical portion, said cylindrical portion when engaging said tubes effective in any angular position to close fluid flow through both said tubes in a positive manner, said conical portion when engaging said tubes effective on rotation to proportion the fluid flow through said tubes and on axial movement to control the quantity of fluid flow.

7. The proportioning valve of claim 6 wherein said support means has a pair of tapering bores, ends of said tubes received within and slightly deformed by said tapering bores to form self-sealing connections.

8. A proportioning valve for two streams of fluid comprising:
   a valve body having a hollow interior and an inlet for each fluid stream;
   a cartridge member within said valve body, said cartridge member including a pair of resilient tubes communicating with said inlets, a hollow head portion communicating with said tubes and outlet means communicating with said head portion;
   a saddle member within said valve body and embracing said tubes between the ends thereof in a tube-deforming manner, said saddle member including spaced walls engaging and positioning the outer walls of said pair of tubes and a reduced web portion connecting said walls;
   and a control element extending transversely between said tubes and engaging and establishing the cross sectional shape of said tubes, said control element rotatable on and movable along its axis and having a generally cylindrical portion coaxial with said axis and a generally conical portion, the larger end of said conical portion adjacent to, concentric with, and the same diameter as said cylindrical portion, the smaller end of said conical portion eccentric with said cylindrical portion, said cylindrical portion when engaging said tubes effective in any angular position to close fluid flow through both said tubes in a positive manner, said conical portion when engaging said tubes effective on rotation to proportion the fluid flow through said tubes and on axial movement to control the quantity of fluid flow;
   said valve body having an outlet communicating with the outlet means of said head portion.

9. A proportioning valve for two streams of fluid comprising:
   a valve body having a hollow interior and an inlet for each fluid stream;
   a pair of resilient tubes within said valve body and communicating with said inlets;
   a saddle member within said valve body and embracing said tubes between the ends thereof in a tube-deforming manner, said saddle member including spaced walls engaging and positioning the outer walls of said pair of tubes, a longitudinal positioning rib on the exterior of each wall and a reduced web portion connecting said walls;
   said valve body having interior grooves which receive said longitudinal ribs and thereby position said saddle member with precision within said valve body;
   and a control element journalled in said valve body and extending transversely between said tubes, said control element having an eccentric cone portion engageable with said tubes, said control element rotatable on and movable along its axis to vary relatively the cross sections of said tubes and thereby proportion the fluid flow through said tubes.

10. A proportioning valve for two streams of fluid comprising:
    a valve body having a hollow interior and an inlet for each fluid stream;
    a pair of resilient tubes within said valve body and communicating with said inlets;
    a saddle member within said valve body and embracing said tubes between the ends thereof in a tube-deformin manner, said saddle member including spaced walls engaging and positioning the outer walls of said pair of tubes and a reduced web portion connecting said walls;
    and a control element extending transversely between said tubes and engaging and establishing the cross sectional shape of said tubes, said control element rotatable on and movable along its axis and having a generally cylindrical portion coaxial with said axis and a generally conical portion, the larger end of said conical portion adjacent to, concentric with, and the same diameter as said cylindrical portion, the smaller end of said conical portion eccentric with said cylindrical portion, said cylindrical portion when engaging said tubes effective in any angular position to close fluid flow through both said tubes in a positive manner, said conical portion when engaging said tubes effective on rotation to proportion the fluid flow through said tubes and on axial movement to control the quantity of fluid flow.

11. A control element for a proportioning valve, comprising:
a handle portion whereby said element is rotatable on and movable along its axis; and
an actuating portion secured to said handle portion including a generally cylindrical portion and a generally conical portion, said cylindrical portion coaxial with said axis, the larger end of said conical portion adjacent to, concentric with, and the same diameter as said cylindrical portion, the smaller end of said conical portion eccentric with said cylindrical portion, said cylindrical portion adapted to engage a pair of resilient tubes and effective in any angular position to close fluid flow through both tubes in a positive manner, said conical portion adapted to engage said tubes and effective on rotation to proportion the fluid flow through said tubes and on axial movement to control the quantity of fluid flow.

12. A proportioning valve for two streams of fluid comprising:
a valve body having a hollow interior and an inlet for each fluid stream;
a pair of resilient tubes within said valve body and communicating with said inlets;
and a control element extending transversely between said tubes and engaging and establishing the cross sectional shape of said tubes, said control element rotatable on and movable along its axis and having a generally cylindrical portion coaxial with said axis and a generally conical portion, the larger end of said conical portion adjacent to, concentric with, and the same diameter as said cylindrical portion, the smaller end of said conical portion eccentric with said cylindrical portion, said cylindrical portion when engaging said tubes effective in any angular position to close fluid flow through both said tubes in a positive manner, said conical portion when engaging said tubes effective on rotation to proportion the fluid flow through said tubes and on axial movement to control the quantity of fluid flow;
said conical portion of said control element having a surface line colinear with a surface line on said cylindrical portion whereby when one tube is fully opened the other tube is fully closed and at any other proportioning position of said control element the combined flow through the two tubes is not greater than the flow through a fully opened tube.

13. A proportioning valve for two streams of fluid comprising:
a valve body having a hollow interior and an inlet for each fluid stream;
a pair of resilient tubes within said valve body and communicating with said inlets;
and a control element extending transversely between said tubes and engaging and establishing the cross sectional shape of said tubes, said control element rotatable on and movable along its axis and having a generally cylindrical portion coaxial with said axis and a generally conical portion, the larger end of said conical portion adjacent to, concentric with, and the same diameter as said cylindrical portion, the smaller end of said conical portion eccentric with said cylindrical portion, said cylindrical portion when engaging said tubes effective in any angular position to close fluid flow through both said tubes in a positive manner, said conical portion when engaging said tubes effective on rotation to proportion the fluid flow through said tubes and on axial movement to control the quantity of fluid flow;
and flat wall portions and a reduced web portion connecting said wall portions within said body, said wall portions engaging the outer walls of said pair of tubes, said wall portions parallel to the axis of said control element whereby the cylindrical portion of said control element is effective at all encountered fluid pressures to close the fluid flow through said tubes.

14. A cartridge member for a proportioning valve comprising a pair of resilient tubes, a cup-shaped head portion communicating with said tubes and an outlet means communicating with said head portion, said cup-shaper head portion having a resilient annular wall and a boss on the internal bottom, said boss serving as a gauge for positioning the cartridge member and as a handle for manipulating same.

References Cited in the file of this patent
UNITED STATES PATENTS

| | | |
|---|---|---|
| 2,177,349 | Corbin | Oct. 24, 1939 |
| 2,190,326 | Benoit | Feb. 13, 1940 |
| 2,556,689 | Grove | June 12, 1951 |
| 2,558,681 | Hachmeister | June 26, 1951 |
| 2,679,865 | Griffith | June 1, 1954 |
| 2,696,221 | Armstrong et al. | Dec. 7, 1954 |
| 2,920,861 | Hartmann | Jan. 12, 1960 |

FOREIGN PATENTS

| | | |
|---|---|---|
| 845,292 | Germany | July 3, 1952 |
| 1,078,061 | France | May 5, 1954 |